(12) United States Patent
Janecek

(10) Patent No.: US 8,033,777 B2
(45) Date of Patent: Oct. 11, 2011

(54) METHOD AND APPARATUS FOR TRANSPORTING AND MOVING LOAD

(75) Inventor: Albin Janecek, Dodge, NE (US)

(73) Assignee: Preferred Pump & Equipment, Fort Worth, TX (US)

( * ) Notice: Subject to any disclaimer, the term of this patent is extended or adjusted under 35 U.S.C. 154(b) by 1126 days.

(21) Appl. No.: 11/283,186

(22) Filed: Nov. 18, 2005

(65) Prior Publication Data

US 2006/0182583 A1      Aug. 17, 2006

Related U.S. Application Data

(60) Provisional application No. 60/629,279, filed on Nov. 18, 2004.

(51) Int. Cl.
*B60P 1/10*     (2006.01)

(52) U.S. Cl. ........................................................ 414/546

(58) Field of Classification Search ................... 414/546
See application file for complete search history.

(56) References Cited

U.S. PATENT DOCUMENTS

| | | | | | |
|---|---|---|---|---|---|
| 3,058,607 | A | * | 10/1962 | Kiley | 414/462 |
| 5,014,863 | A | * | 5/1991 | Vlaanderen | 212/299 |
| 5,242,094 | A | * | 9/1993 | Finley | 224/324 |
| 5,297,912 | A | * | 3/1994 | Levi | 414/462 |
| 5,398,778 | A | * | 3/1995 | Sexton | 182/127 |
| 5,850,891 | A | * | 12/1998 | Olms et al. | 182/127 |
| 6,315,181 | B1 | * | 11/2001 | Bradley et al. | 224/310 |
| 6,854,627 | B2 | * | 2/2005 | Villarreal et al. | 224/310 |
| 2002/0090285 | A1 | * | 7/2002 | Levi | 414/462 |
| 2002/0117523 | A1 | * | 8/2002 | Ketterhagen | 224/310 |
| 2006/0280583 | A1 | * | 12/2006 | Settelmayer et al. | 414/462 |

* cited by examiner

*Primary Examiner* — Joshua Rudawitz
(74) *Attorney, Agent, or Firm* — SNR Denton US LLP; Brian R. McGinley

(57) ABSTRACT

The present invention comprises a method and apparatus of transporting and moving a load having a combination of a hoist arm and an apparatus of a support structure with one or more (preferably a pair of opposed) moveable carriages.

28 Claims, 4 Drawing Sheets

METHOD AND APPARATUS FOR TRANSPORTING AND MOVING LOAD

This application claims priority pursuant to 35 U.S.C. 119(e) to U.S. Provisional Patent Application Ser. No. 60/629,279, filed Nov. 18, 2004, the entire disclosure of which is incorporated herein by reference.

FIELD OF THE INVENTION

This present invention generally relates to methods and apparatus for carrying, transporting and moving loads which may be used in a variety of industries including, but not limited to: water wells, construction, utilities, telecommunications, gas and related industries.

BACKGROUND OF THE INVENTION

In the water well industry, a machine is manufactured called a hydraulic pump hoist. It is designed of primarily steel tubular construction, upfits to a service body mounted on a chassis cab, and is a mobile machine designed to be transported from place to place. Its primary function is to extract coupled pipe from a water well by means of a telescoping hydraulic derrick and a hydraulic winch with cable.

The coupled pipe may be hundreds of feet deep in the water well. The pipe is normally in 21-foot lengths, and is fastened in a continuous fashion with pipe couplings. When the pipe is extracted out of the well, the couplings are taken loose (one at a time), and the pipe must be handled at the ground level in 21-foot lengths. Once the pipe is uncoupled, the operator and his helper must handle it. The only way of storing or containing the pipe has been by utilizing stationary pipe racks. Conventional stationary pipe racks must be mounted high on the pump hoist frame to clear both the frame and the top of the chassis cab.

Serious safety and efficiency problems arise out of this stationary storage system. A dangerous working environment is created when the handlers have to load and unload the pipes due to height and other obstructions with the pump hoist, service body, and truck in general.

SUMMARY OF THE INVENTION

The present invention comprises methods and apparatus for storing, transporting and moving loads. The present invention includes a support structure with one or more (preferably a pair of opposed) moveable carriages. A hoist arm may also be attached to a chassis and includes a hook located on the end of an extendable member.

The support structure, which in a preferred embodiment includes a four bar linkage system, is mounted to the truck and a moveable carriage is provided on either or both sides of the support structure. The carriage is moveable or rotatable from a first or upper position to a second or lower position. In a preferred embodiment the carriage is rotated up to approximately 90 degrees from the upper to the lower position, or vice versa.

The carriage can be moved or rotated in any of a number of way, such as manually using a winch system or with a power source using a hydraulic lift, a linear actuator, or a compressed air system.

Thus, in a preferred embodiment of the present invention (1) the working load has been lowered to a very comfortable, safe, and unobstructed working position, and (2) the working load has been lowered down on an arc, which allows the carriage to be stabilized by linkage arms preferably approximately 18 inches clear of the service body and truck. This allows the worker or workers to carefully and efficiently carry the load alongside the carriage and load or remove it.

These and other objects and advantages of the present invention will be classified in the following description of the preferred embodiment in connection with the drawings, the disclosure and the appended claims, wherein like reference numerals represent like elements throughout. The drawings constitute a part of this application and include exemplary embodiments of the present invention and illustrate various features thereof.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present inventions is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
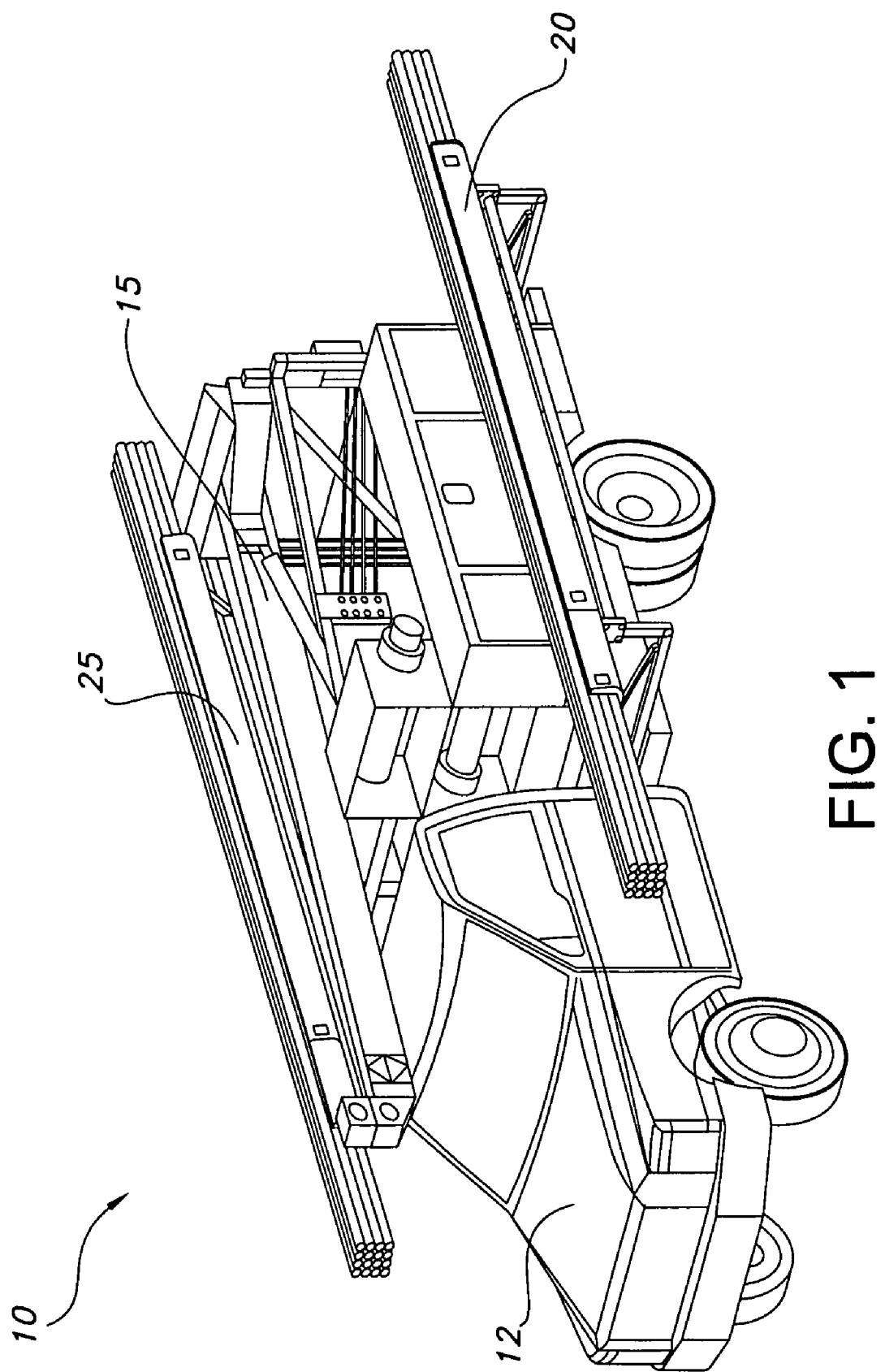
FIG. 1 is a perspective view of the load moving apparatus exemplifying the present invention.
Figure 2:
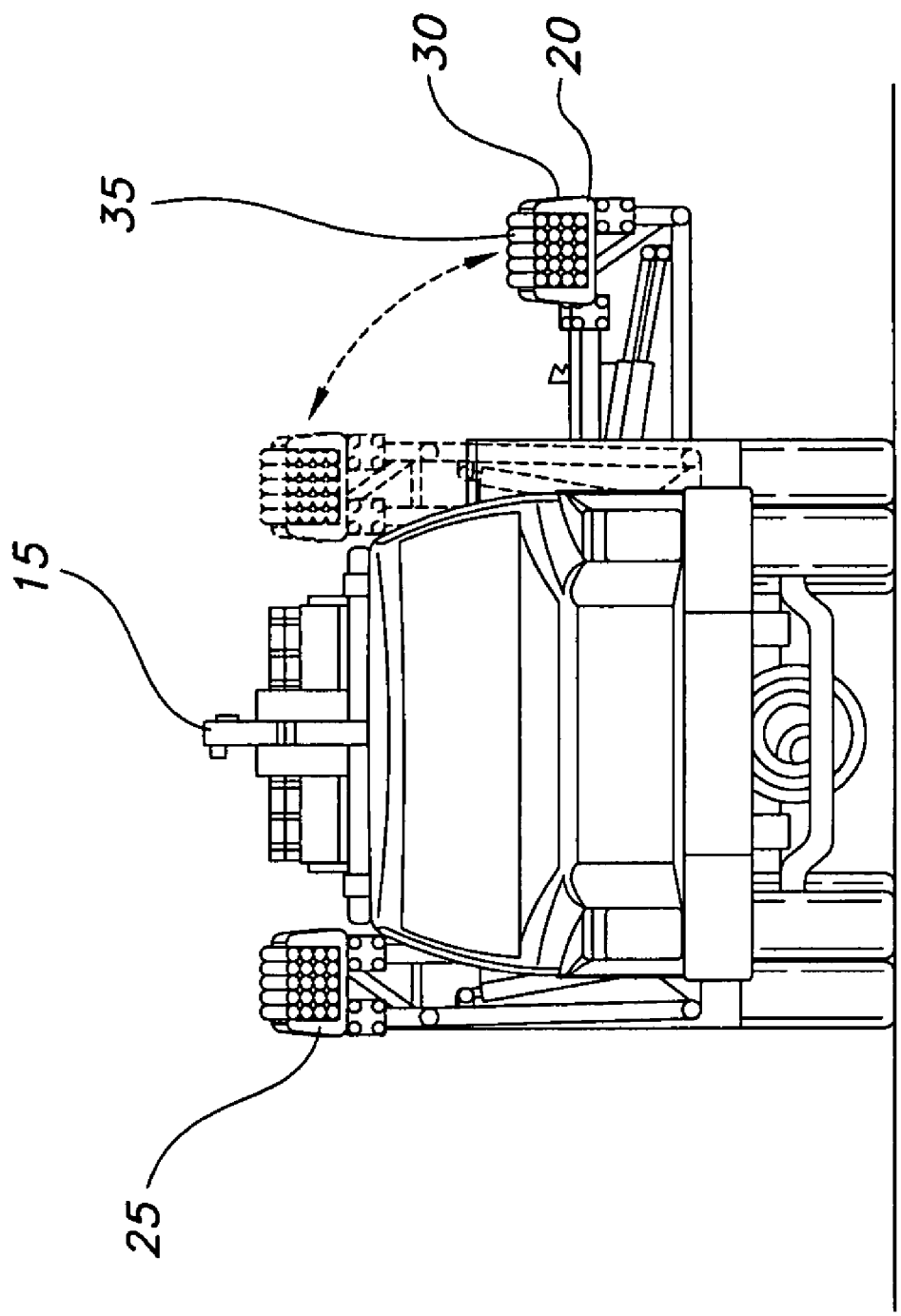
FIG. 2 is a front, elevational view of the load moving apparatus of FIG. 1 illustrating a carriage thereof moving from a lower or extended position (in solid lines) to an upper retracted position (in dashed lines).
Figure 3:
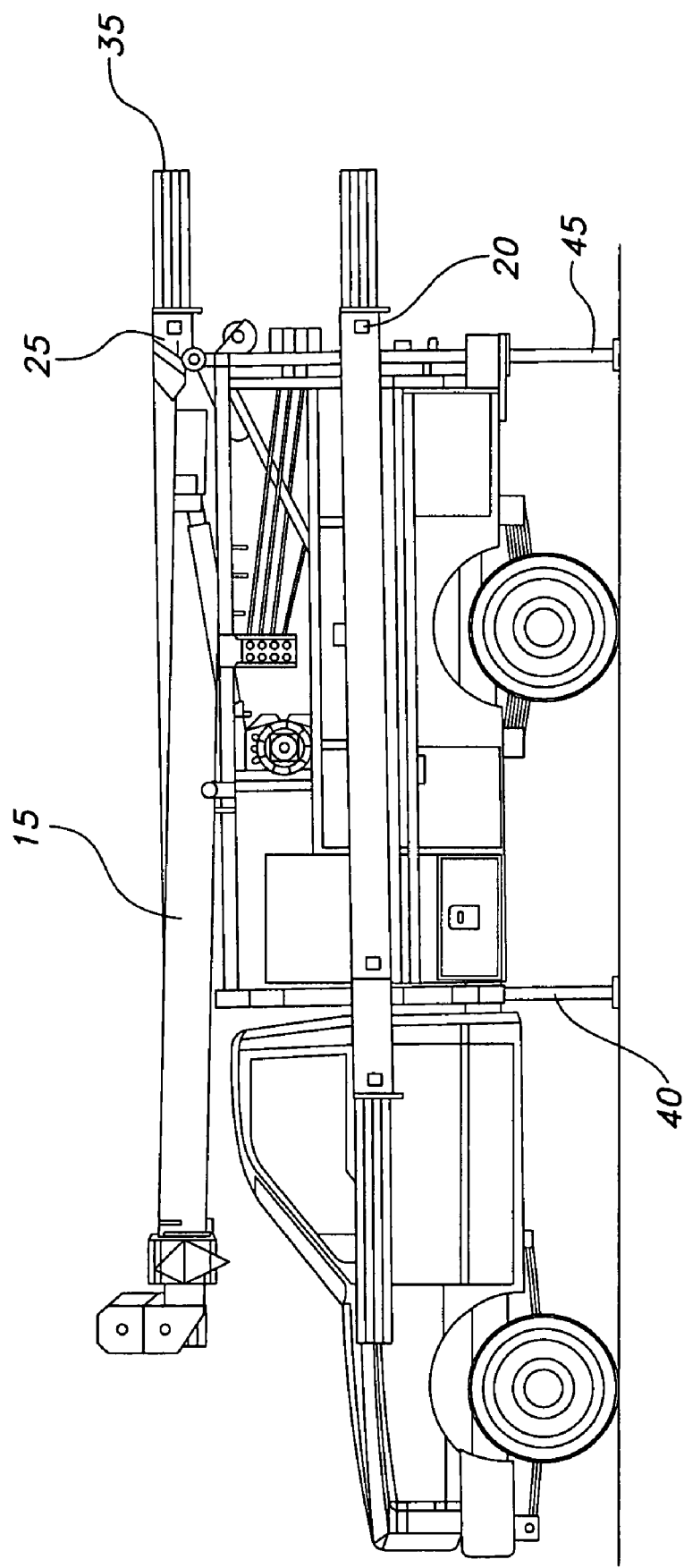
FIG. 3 is a side, elevational view of the apparatus of FIG. 1.

The invention generally comprises a support structure and a moveable carriage for receiving a load such as pipes. For example, referring to the drawings in greater detail, FIG. 1-FIG. 3 illustrate an apparatus for moving and transporting a load 10 exemplifying the present invention. The apparatus 10 is shown mounted to the bed of a truck 12. The apparatus 10 generally comprises a hoist 15, and first and second hydraulic powered carriages 20, 25. The hoist 15 is generally mounted on top of a chassis cab. A front stabilizer 40 and a rear stabilizer 45 are mounted under the front and rear of the chassis cab and can be utilized when the carriages 20, 25 are in motion.

Figure 4:
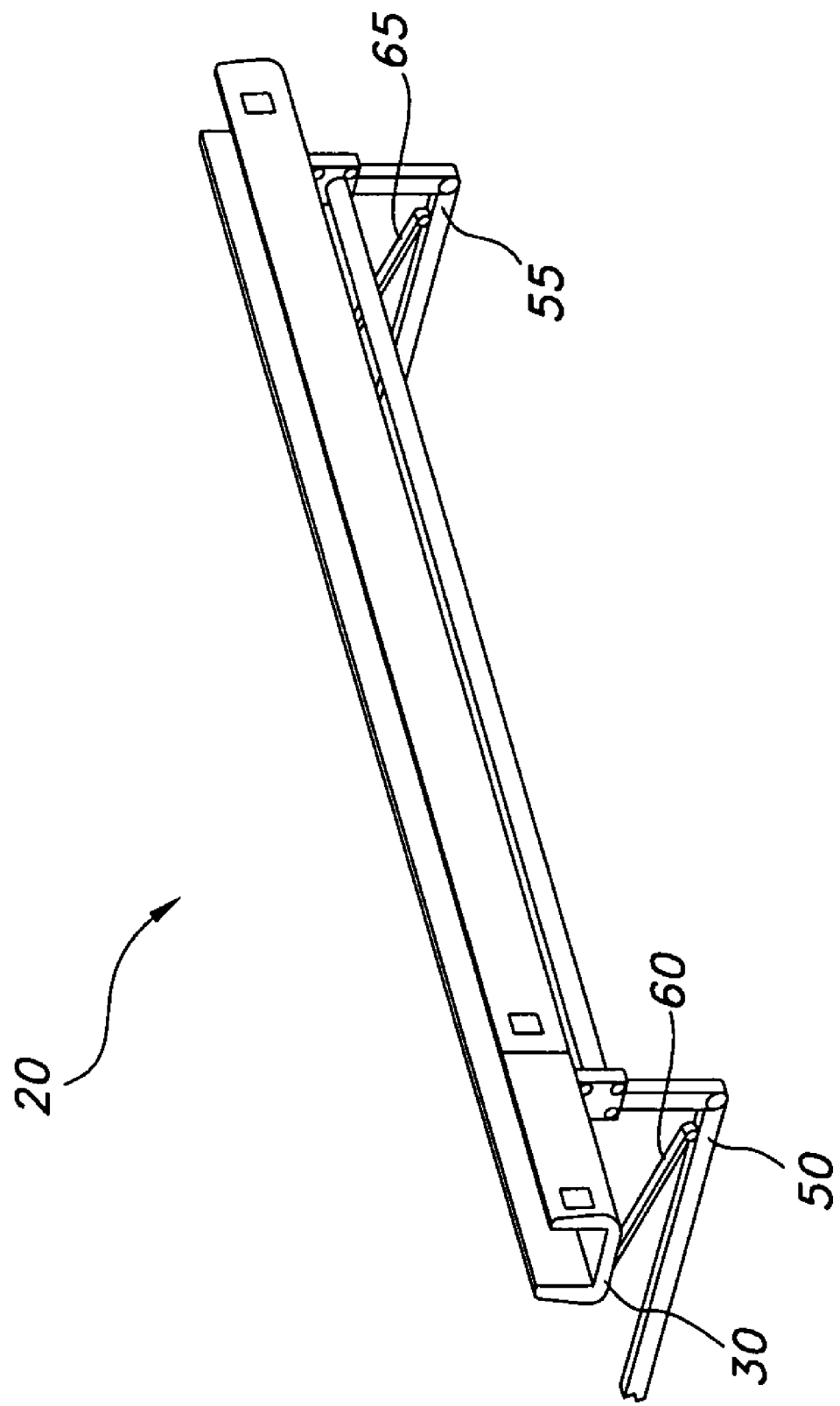
FIG. 4 is an enlarged, fragmentary perspective view of a carriage of the apparatus of FIG. 1.

The hydraulic carriages 20, 25 are shown mounted on opposite sides of the truck bed (the carriages can also be mounted directly to the chassis and reinforced). Referring to FIG. 2 and FIG. 4, each carriage 20, 25 includes a generally U-shaped (cross section) lift 30 sized to carry a load such as pipe 35.

In a preferred embodiment the carriages 20, 25 are powered by one or more hydraulic pistons through various support members (illustrated in FIG. 1-FIG. 4) that allows for the movement or rotation of the carriages 20, 25 from an upper position (that is a substantially vertical position) to a second position that is extended and lower than the vertical position (see FIG. 2). Although the drawing shows a hydraulic lift it is understood that a manual system, such as a winch system, or alternate power sources, such as a linear actuator or compressed air system, could be used.

Referring to FIG. 2, the carriages 20, 25 are each rotatable approximately 90 degrees in opposite directions (as depicted in FIG. 2, carriage 20 rotates clockwise and carriage 25 rotates counterclockwise). Movement of the carriages can be stopped and maintained at any position between the upper and lower positions.

The carriages 20, 25 can be returned by rotating from the lower position to the upper position. The carriages 20, 25 can be moved independent from one another (i.e., one after the other) or together at the same time.

Referring to FIG. 3 the truck can have moveable front stabilizer 40 and a rear stabilizer 45. These stabilizers 40, 45 adjusted to contact the ground or other surface to provide additional support when the carriage 20, 25 are in motion.

Referring to FIG. 4 the carriage assembly 20 has a front support member 50 and a rear support member 55. The support members 50, 55 are fastened to a generally U-shaped lift 30 sized to carry a load. In a preferred embodiment first and second linkage bars 60, 65 are provided to facilitate movement and rotation of the assembly between upper and lower positions.

In operation the vehicle or truck 12 can easily move the load from one location to another. Typically when moving a load from one location to another, the carriages 20, 25 will be secured in the upright vertical position to safely hold the load in place. Once the vehicle is positioned at an appropriate location, it is possible to unload the apparatus preferably by moving the carriages 20, 25 from the upright position to a lower position to allow for easy access to the load. The carriages 20,25 may be unloaded manually or through the use of powered machines such as a hoist. The apparatus 10 of the present invention can easily be modified to cooperate with other machinery to facilitate loading and unloading. As indicated previously, during operation front and rear stabilizers 40, 45 can also be used to provide additional stability to the vehicle, depending upon the various circumstances encountered at a particular location and the weight of the load and other factors.

Although it is believed to be apparent from the foregoing description, the present invention also includes a method for transporting and moving a load. The method generally comprises providing a support structure having at least one carriage. The carriage is capable of holding a load and is moveable from a first substantially vertical position to a second substantially horizontal position wherein the second position is lower than the first position.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. An apparatus for carrying a load, comprising:
a support structure;
a carriage mounted to the support structure, the carriage capable of receiving a load;
the carriage moveable between a substantially vertical position and a substantially horizontal position; and
the load maintained in a same orientation in the substantially vertical position and the substantially horizontal position.

2. The apparatus of claim 1, wherein the movement of the carriage is hydraulically powered.

3. The apparatus of claim 1, wherein the movement of the carriage is powered by linear actuator.

4. The apparatus of claim 1, wherein the movement of the carriage is accomplished by manual actuation of a winch system.

5. The apparatus of claim 1, wherein the movement of the carriage is powered by compressed air.

6. The apparatus of claim 1, wherein the substantially horizontal position is lower than the substantially vertical position.

7. An apparatus for carrying a load, comprising:
a powered vehicle;
first and second opposed carriages mounted to the vehicle each said carriage capable of carrying a load;
said first and second carriages rotatable in opposite directions and having a range of motion defined by a substantially vertical position and a substantially horizontal position with respect to the powered vehicle.

8. The apparatus of claim 7 wherein the movement of the carriage is hydraulically powered.

9. The apparatus of claim 7 wherein the movement of the carriage is powered by linear actuator.

10. The apparatus of claim 7 wherein the movement of the carriage is powered by compressed air.

11. The apparatus of claim 7 wherein the movement of the carriage is accomplished by manual actuation of a winch system.

12. The apparatus of claim 7 wherein the substantially horizontal position is lower than the substantially vertical position.

13. A method for carrying a load, comprising:
providing a support structure and at least one carriage moveable about the support structure;
moving the carriage with respect to the support structure between a substantially vertical position and a substantially horizontal position to receive a load in a predefined orientation and store a load in the predefined orientation.

14. The method of claim 13 wherein the movement of the carriage is hydraulically powered.

15. The method of claim 13 wherein the movement of the carriage is powered by linear actuator.

16. The method of claim 13 wherein the movement of the carriage is powered by compressed air.

17. The method of claim 13 wherein the movement of the carriage is accomplished by actuation of a winch system.

18. The method of claim 13 wherein the substantially horizontal position is lower than the substantially vertical position.

19. The method of claim 13, further comprising:
maintaining the preconfigured orientation of the load during movement of the at least one carriage between the substantially vertical position and the substantially horizontal position.

20. The method of claim 13, wherein the substantially vertical position is along an upper horizontal plane and the substantially horizontal position is along a lower horizontal plane.

21. The method of claim 13, further comprising:
mounting the support structure on a vehicle having a horizontal top surface and a vertical side surface.

22. The method of claim 21, wherein the substantially vertical position orientates the support structure in an upper position parallel to a vertical side of the vehicle and the substantially horizontal position orientates the carriage in a lower position perpendicular to the vertical side of the vehicle.

23. The method of claim 21, wherein the upper position orientates the carriage parallel to the vehicle horizontal top surface and the lower position orientates the carriage perpendicular to the vehicle vertical side surface.

24. The method of claim 13, further comprising:
facilitating access to the at least one carriage in the substantially horizontal position relative to the substantially vertical position; and
impeding access to the at least one carriage in the substantially vertical position relative to the substantially horizontal position.

25. The method of claim 13, further comprising:
providing a carriage-support arm to position the at least one carriage in either the substantially vertical position or the substantially horizontal position and having a predefined range of motion.

26. The method of claim 25, wherein the predefined range of motion is 90 degrees.

27. The method of claim 25, wherein the substantially vertical position defines the upper-most point of the predefined range of motion and the substantially horizontal position defines the lower-most point of the predefined range of motion.

28. The method of claim 13, wherein the load is substantially contained within the at least one carriage.

* * * * *